United States Patent [19]

Judd

[11] Patent Number: 4,463,288
[45] Date of Patent: Jul. 31, 1984

[54] CATHODE RAY TUBE DRIVE CIRCUITRY

[75] Inventor: Ian D. Judd, Eastleigh, England

[73] Assignee: International Business Machines Corporation, Armonk, N.Y.

[21] Appl. No.: 288,862

[22] Filed: Jul. 31, 1981

[30] Foreign Application Priority Data

Oct. 31, 1980 [EP] European Pat. Off. ........ 80303881.9

[51] Int. Cl.³ .............................................. H01J 29/56
[52] U.S. Cl. ..................................... 315/371; 315/367
[58] Field of Search ............... 315/370, 371, 367, 403; 340/814, 749, 741, 736, 740, 750

[56] References Cited

U.S. PATENT DOCUMENTS 3,809,947  5/1974  Ambrico et al. .................... 315/370
4,305,022  12/1981  Mitamura et al. .................. 315/370

OTHER PUBLICATIONS

"Bidirectional Scan for CRT", A. S. Murphy IBM Tech. Disclosure Bull., vol. 21, No. 12 (May 1979).

Primary Examiner—Maynard R. Wilbur
Assistant Examiner—M. R. Gordon
Attorney, Agent, or Firm—Joseph J. Connerton

[57] ABSTRACT

Cathode ray tube drive circuitry in which non-linearity of the line scan is corrected by varying the frequency of the pel clock oscillator in accordance with anticipated variations in scanning speed. Predetermined speed corrections are stored in a digital store 23 and, by means of digital to analog converter 24 and integrator 25, are applied to the control input of a voltage controlled oscillator 13. Synchronization of the pel clock with the X-deflection waveform is effected by means of a parallel phase-locked loop comprising counter 15, sample and hold 18, amplifier 20 and low pass filter 21. Preferably a sinusoidal waveform is applied to the X-deflection coil in such a manner as to have a bidirectional raster scan, the X-deflection coil forming part of a tuned circuit of the sinusoidal waveform generator.

5 Claims, 8 Drawing Figures

CATHODE RAY TUBE DRIVE CIRCUITRY

BACKGROUND OF THE INVENTION

This invention relates to drive circuitry for a cathode ray tube.

The use of the cathode ray tube for the display of computer-generated data has led to more demanding operating standards being required of the drive circuitry as compared with the requirements of domestic television equipment. Many of the circuits which have proved adequate for television have had to be redesigned. Although much research is being put into alternative display technologies, the low cost and continued improvements of the cathode ray tube have ensured that efforts continue to be made to improve its capacity and resolution. It is envisaged that the cathode ray tube can display images consisting of over four million picture elements (pels) produced by the momentary brightening of the cathode ray beam as it is caused to scan a raster across the tube screen. Such a requirement implies a line frequency of about 100 kHz, which would impose extremely high stresses on the active device in conventional circuitry which relies on sawtooth wave generators. A high line frequency means a short flyback time during which stored energy must be removed from the deflection coils. Because of imperfect switching performance at these power levels, the peak collector dissipation in the line scan transistor can reach 1 Kw with an average value of about 50 w. Such stresses will lead to component failure and consequent device unreliability. Providing suitable higher power components raises the costs of the drive circuitry to unacceptable levels and means that advantage cannot be taken of integrated circuit techniques.

In the past, much effort has been expended in obtaining good linearity of the line scan, that is to ensure that the beam moves along each scan line at a constant speed. This permits the use of a constant frequency clock to control the modulation of the beam intensity. Variations in scanning speed cause images to be distorted due to the beam being turned on at the wrong position.

To avoid the stresses involved with a conventional sawtooth line scan circuit, it may be desirable to use a sinusoidal line scan generator and/or to use a bidirectional raster. A bidirectional raster is described, for example, in the IBM Technical Disclosure Bulletin, Volume 21, No. 12, May 1979 at pages 5025 and 5026. A sinusoidal deflection waveform is described, for example, in the IBM Technical Disclosure Bulletin, Volume 14, No. 4, September 1971 at pages 1118 and 1119. One problem with such techniques, however, is how to achieve adequate linearity of the line scan. A second problem is present when bidirectional scanning is employed and the ferrite core of the deflection yoke exhibits hysteresis or the drive waveform contains asymmetric distortion components. These aberrations cause vertical misalignment of the pels in alternate scan lines.

Although it is highly desirable for the line scan to be perfectly linear, it is unlikely, or indeed impossible that exact linearity can be obtained in practice. Clearly non-linearity will be a problem in any high precision CRT display, whether it employs standard sawtooth, modified sawtooth or sinusoidal line scan waveforms with or without bidirectional raster scanning.

SUMMARY OF THE INVENTION

A prime object of the invention is to provide cathode ray tube drive circuitry which employs means for correcting for non-linearity of the line scan, thereby avoiding the image distortions mentioned above. The invention is particularly valuable in a bidirectional raster scan arrangement employing a sinusoidal line scan waveform in which the sinusoidal waveform is generated using a tuned circuit of which the deflection yoke forms a part.

According to the invention, cathode ray tube drive circuitry comprises means for tracing a raster on the screen including a deflection yoke which is arranged to operate in cooperation with deflection signal generator means so as to cause the electron beam repetitively to trace a line across the screen, and means for generating pel clock pulses each defining an interval during which the intensity of the electron beam is modulated in accordance with the required image, and is characterized in that said circuitry comprises a variable frequency oscillator for producing said pel clock pulses, a digital store containing representations indicative of anticipated variations in scanning speed at certain points of the scanned line, and means for varying the frequency of the oscillator in accordance with the stored representations thereby to correct for anticipated speed variations in the scanning speed by slowing or speeding the oscillator.

In the preferred embodiment of the invention, the deflection signal generator operates to generate a sinusoidal deflection waveform and includes a tuned circuit comprising the deflection yoke. Additionally the generator preferably operates to trace successive lines in opposite directions across the screen.

The foregoing and other objects, features and advantages of the invention will be apparent from the following more particular description of preferred embodiments of the invention, as illustrated in the accompanying drawings.

DETAILED DESCRIPTION OF THE INVENTION

Figure 1:
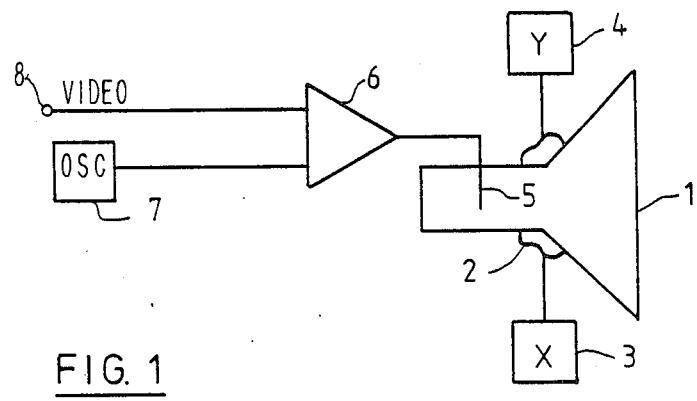
FIG. 1 shows a typical CRT display system.

FIG. 1 of the drawings shows a typical system for controlling a cathode ray tube utilizing a raster in displaying an image on the screen. The cathode ray tube 1 is provided with X and Y deflection coils, shown schematically at 2, supplied with X and Y deflection currents from current generators 3 and 4 respectively. The X-deflection current is a repetitive waveform, such as a sawtooth, which causes the electron beam to trace a line across the screen at the line repetition frequency. The Y deflection current is a more slowly repeating signal which moves the beam slowly down the screen and returns it quickly to the top of the screen. The intensity of the electron beam is controlled by the signal applied to a grid 5 of the electron gun (not shown) generating the beam, which signal operates selectively to reduce the intensity of the beam to below the level at which the phosphor of the screen is stimulated to emit light. This signal, sometimes called a blank-unblank signal, is supplied from the output of a gate circuit 6, one input of which is connected to an oscillator 7 which supplies a stream of gating pulses which will be called hereinafter the pel clock pulses, the term "pel" meaning picture element i.e., the smallest element of the display image generated at the screen. The other input to gate 6 is a video signal at terminal 8. How this signal is generated forms no part of the present invention. It usually consists of sequences of binary signals representing the desired state of each pel, illuminated or dark, or, as it is more usually stated, on or off. The binary signals are separated by line blanking periods which mark the period during which the beam is being returned from one side of the screen to the other, and field blanking periods which mark the period during which the beam is being returned from the bottom to the top of the screen. At relatively low resolutions, that is with the picture elements large and well spaced from each other, the system of FIG. 1 works adequately.

Figure 2:
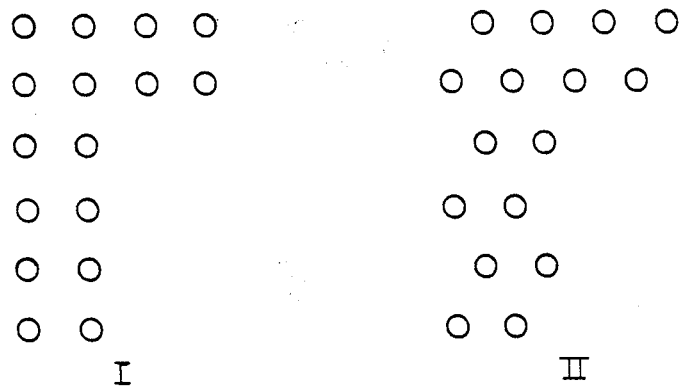
FIG. 2 illustrates how errors can be produced when bidirectional scanning is employed.

At high resolutions, however, when a bidirectional line scan is being used, that is with small picture elements which are closely spaced, distortions of the image occur because of small variations in the speed at which the beam is traced across the screen. This will result in the pels being spaced too close together or too far apart. When a bidirectional line scan is used, variations due to hysteresis in the core of the deflection windings can give rise to the effect shown in FIG. 2, where, instead of being located one above the other as in example I, corresponding pels are displaced as shown, for example, in II. The result is that characters become difficult to read and the advantages gained by increasing the resolution are lost.

Figure 3:
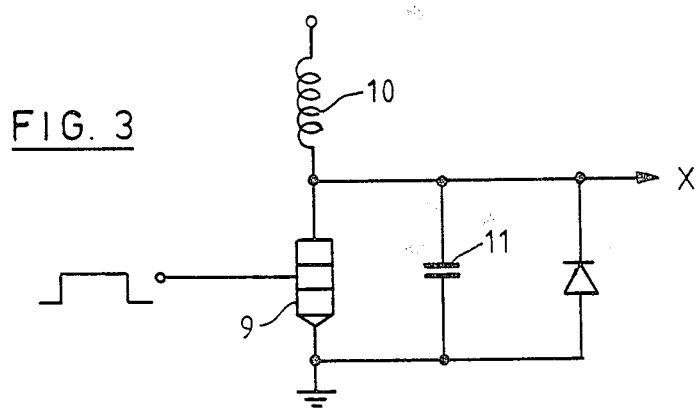
FIG. 3 shows a typical sawtooth horizontal deflection circuit.

FIG. 3 shows a simplified standard output circuit for horizontal deflection in which a transistor 9 is used to switch a constant voltage across the deflection coils 10. In combination with the coil inductance, this provides a linear rise of current with time and hence a linear angular deflection of the electron beam. At the end of each sweep when the current through the coils has risen to some value I, the switch is turned off and the coil inductance forms a resonant circuit with a parallel capacitor 11. The voltage at point X first rises to a large positive value when the current through the coils 10 is zero and then drops to zero when the current has reversed to −I. At this time the switch 9 is turned on again to begin the next sweep.

This circuit has quite low power dissipation, since stored energy is neatly transferred from the inductance of the coils 10 to the capacitor 11 and back again. Also the transistor 9 is only conducting when the voltage across it is small. However, during the flyback, the peak voltage across the transistor is very high and this, combined with fairly large deflection current needed, necessitates an expensive device.

Figure 4:
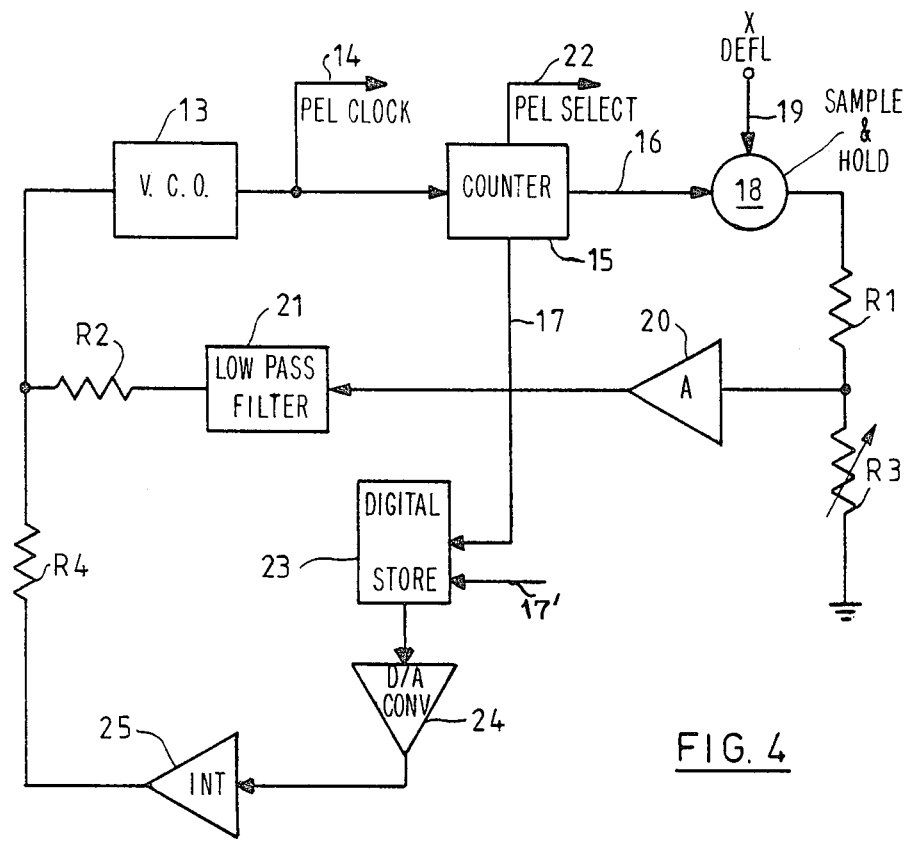
FIG. 4 is a circuit diagram showing how the pel clock signals are synchronized with the X-deflection waveform.

FIG. 4 shows one embodiment of the invention, in which synchronization of the pel clock with the sinusoidal X-deflection waveform is effected by means of a phase-locked loop. The pel clock frequency is varied to compensate for the differences between the actual horizontal speed of the electron spot and the desired constant speed.

The pel clock signals are generated by a voltage controlled oscillator 13 and are provided on line 14 for use as described with reference to FIG. 1. A counter 15 counts up to the number of pel clock pulses required for each pair of forward and backward scan lines. When the number of pulses has been counted, the counter 15 emits a pulse on conductor 16. Conductor 16 is connected as one input to a sample and hold circuit 18 which receives on line 19 the X-deflection waveform from the deflection coils. The remainder of the phase-locked loop consists of resistor R1, amplifier 20, low-pass filter 21 and resistor R2. Variable resistor R3 is provided to enable adjustment of the position of the picture elements on the raster line, i.e., to move them as a block to the right or left. Counter 15 also provides at line 22 signals for selecting the pel to be displayed in each clock period in known fashion.

A store 23 is provided which contains the speed corrections required to correct image distortion for each sector into which a pair of scan lines has been notationally divided. These are accessed in turn in response to the signals on line 17 and are read to digital-to-analog converter 24 and integrator 25. The output of integrator 25 is connected to a resistor R4 which forms with resistor R2 a summing circuit connected as control input to the voltage controlled oscillator 13. The portion of the control input provided via R4 is arranged to sum to zero over a pair of scan lines. Thus R4 provides only the dynamic corrections required to correct linearity and does not interfere with the long term synchronization of the voltage controlled oscillator and the X-deflection waveform. The adjustment of oscillator 13 is in the same sense as the relative magnitudes of the real and ideal deflection currents. If the rate of change of the real deflection current is larger than the predetermined value, the beam is moving faster than is appropriate for linearity, causing the pels to be more spaced out than they should be. In this case the frequency of the pel clock should be increased. If the rate of change of the deflection current is less than the ideal, the opposite situation exists and the frequency of the pel clock should be decreased. This is illustrated in FIG. 5.

Figure 5:
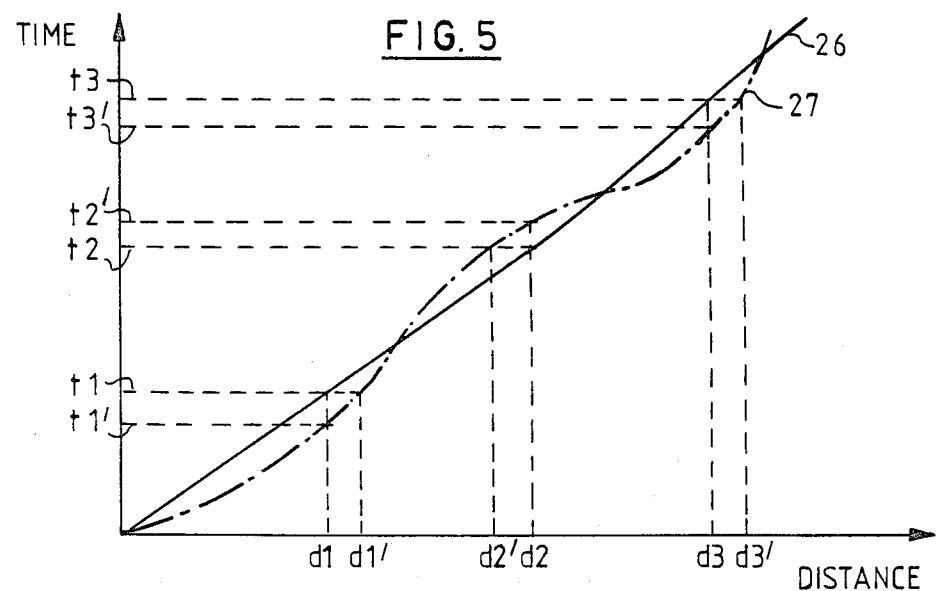
FIG. 5 explains how the non-linearity errors are compensated in accordance with the present invention.

In FIG. 5, solid line 26 represents an ideal deflection waveform for linearity. To generate pels at distances d1, d2 and d3 along the scan line, the pel oscillator 13, FIG. 4, provides pulses at times t1, t2 and t3. However, if the deflection waveform is imperfect, as represented by curve 27, pulses at times t1, t2 and t3 will cause the pels to be located incorrectly at points d1', d2' and d3' along the scan line. However, by varying the frequency of the pel oscillator in accordance with the present invention so that the pulses are at times t1', t2' and t3', the pels will be in their correct positions d1, d2 and d3.

Although the invention is equally applicable to any type of deflection waveform, for the very high pel frequencies in which the invention is particularly applicable, frequencies in excess of 100 kHz, it is proposed to use a sinusoidal current waveform to trace the raster lines across the screen.

With the sinewave system, the deflection coils can be made part of a resonant circuit. If this is parallel tuned, then the bulk of the deflection current circulates within the circuit and the active devices need only replenish circuit losses. A tap on the tuned circuit can be used to reduce the driving impedance to a reasonable value.

Figure 6:
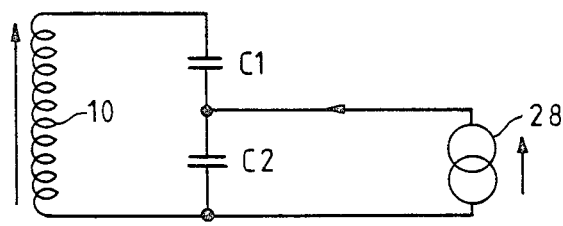
FIG. 6 shows how a sinusoidal waveform generator can employ the deflection yoke as part of a resonant (parallel-tuned) circuit.

FIG. 6 shows such a parallel tuned arrangement. Drive circuit 28 having a high output impedance provides reasonable voltage and current (for example 10 volts and 1 amp) and with the value of capacitor C2 very much larger than capacitor C1 a high voltage of approximately 1000 volts, 2 amps can be provided in the deflection coil 10.

Figure 7:
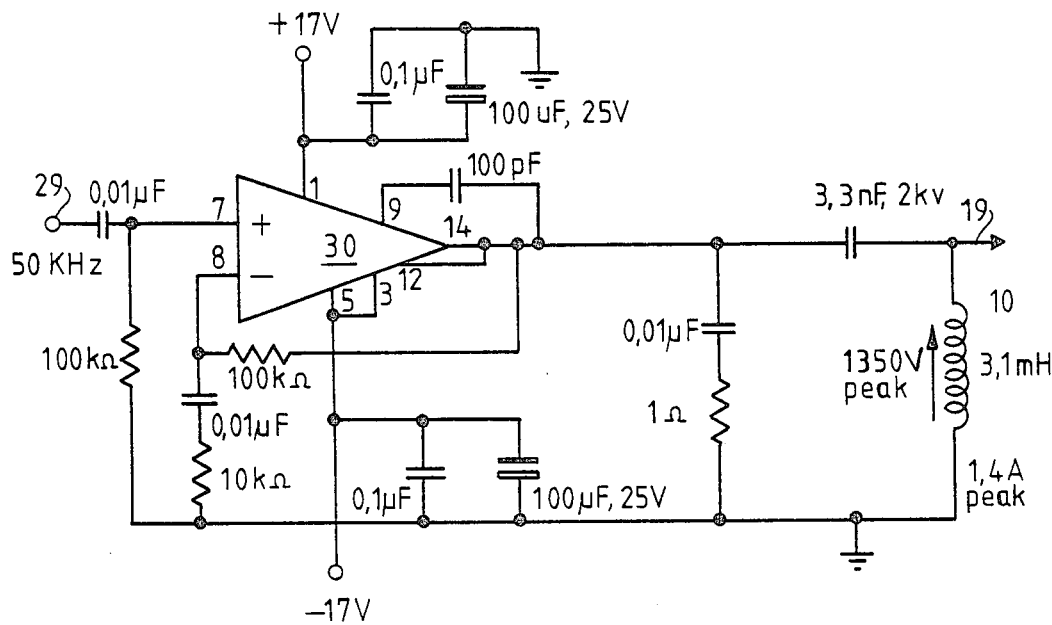
FIG. 7 illustrates a practical sinusoidal waveform generator which is series-tuned with the yoke.

Alternatively, a series tuned circuit can be used, in which case the high voltage across the yoke is almost exactly canceled by an out-of-phase voltage across the capacitor. This arrangement requires a drive circuit with a low output impedance and is the system which is preferred since it is directly compatible with integrated audio amplifiers. A practical circuit is shown in FIG. 7 in which a 50 kHz sinusoidal waveform of 1.2 volts peak is applied to an input 29 connected to the positive input of amplifier 30. The amplifier 30 shown is an SGS-ATES audio amplifier type TDA 2010. The numbers around the periphery of the amplifier represent the pin numbers of the amplifier. The solid plates of the electrolytic capacitors of 100 mf, 25 volts represent the negative plates of these capacitors. With an input voltage determined by the quality of the resonant circuit and component values shown, this circuit will produce a sinusoidal voltage in the deflection coil 10 (shown as having an inductance of 3.1 mH) of 1350 volts, 1.4 amps peak.

A fundamental advantage of sinusoidal systems is that component stresses are essentially independent of frequency. With the sawtooth circuit of FIG. 3, higher frequency means a shorter flyback time and a higher peak voltage.

The disadvantages of a basic sinusoidal system are principally:

(1) Deflection linearity may be a problem at the screen edges due to the rounded tops of the sine current waveform. This effect can be mitigated to a large extent by overscanning the screen so that data is not displayed when the current is changing very slowly, and also by using a wide angle CRT. This is because the deflection distance is given approximately by the tangent of the deflection angle which compensates for the sine current waveform. A full analysis of the linearity question taking into account the moving deflection center, screen curvature and the possibility of overscan shows that when scanning the long axis of a 110° CRT, a duty cycle of 70% is achievable with velocity variations of +5%-7%.

(2) The duty cycle available for the display of data is too low unless bidirectional scan is used. This raises problems of vertical pel misalignment between the forward and backward scans if hysteresis is present in the yoke or if the deflection current waveform contains distortion greater than about 0.01%. The distortion requirement is easily met, since the Q of the tuned circuit will attenuate harmonics by about 100, so that the drive waveform need only have a THD (total harmonic distortion) of less than 1%.

The circuit described above with reference to FIG. 4 corrects these linearity and hysteresis aberrations, provided they are stable with time. Each pair of scan lines is divided into a number of zones, the store 23 supplying a parameter to vary the speed of the voltage controlled oscillator 13. The values of the parameter for each zone can be chosen to make the pel spacing and position on the screen exactly as desired. The digital store 23 may either be a read only store programmed at the factory, or a random access memory whose contents are set up as a result of some user adjustment procedure.

Two further small complications arise from the use of bidirectional scanning. First, the vertical deflection must be performed by a staircase waveform rather than the usual ramp to avoid line pairing at the sides of the screen. This could be provided by a line counter feeding a D/A converter. Second, the video data stream must be supplied in reverse order on alternate lines. It is envisaged that high-content displays will normally use a bit-per-pel buffer for refresh. In this case, the words of the buffer can easily be addressed in descending order on alternate lines and a bidirectional shift register can be used for the final serialization.

Figure 8:
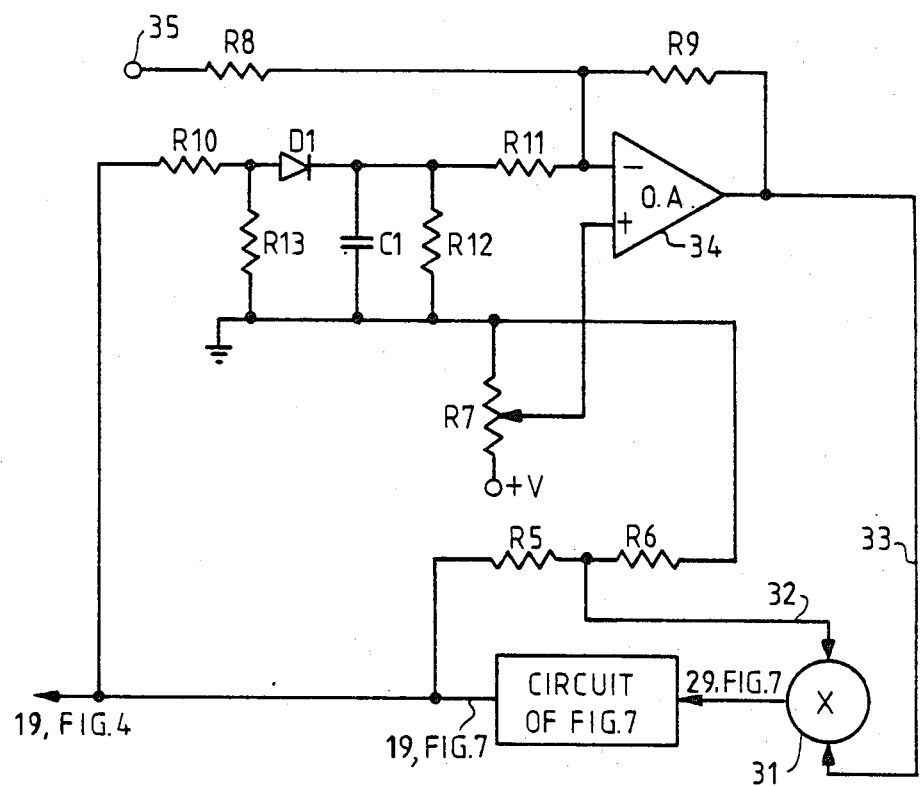
FIG. 8 is a schematic showing how E-W pin-cushion correction can be applied to the circuit of FIG. 7.

FIG. 8 is a schematic of the complete sinusoidal deflection generator, illustrating how E-W pincushion correction can be applied to the circuit of FIG. 7 using an analog multiplier 31, for example a Motorola Type MC1494 multiplier, connected to the input 29, FIG. 7. The two inputs 32 and 33 to the multiplier 31 are from the voltage divider constituted by resistors R5 and R6 and from operational amplifier 34.

In the circuit of FIG. 8, the multiplier 31 functions as an amplifier with the voltage divider constituted by resistors R5 and R6 reducing the voltage appearing across the yoke 10, FIG. 7 and supplying this reduced voltage on input line 32. The gain is determined by a control voltage on line 33 from operational amplifier 34. The signal path from line 32 to line 29 completes a positive feedback loop through the amplifier 30, FIG. 7 to form a sinewave oscillator circuit. The amplitude of oscillation, and hence the picture width, is stabilized by detecting the peak amplitude of the deflection coil voltage, comparing it with a target value and adjusting the control voltage on line 33 accordingly. The target value is a function, for example parabolic, of the vertical beam position to effect E-W (east-west) pincushion correction. The pincushion correction waveform is applied to input 35. Variable resistor R7 allows the width of the picture to be controlled.

Resistors R8 and R11 perform a summing function at the negative input of the operational amplifier 34. Resistor R8 provides an input dependent on the vertical position of the electron spot, while resistor R11 provides an input dependent on the amplitude of the horizontal deflection. The amplifier 34 compares the sum of these two components with a constant voltage adjusted by variable resistor R7, and any difference is amplified with a gain determined by resistor R9 which provides negative feedback. The amplified difference is used as a control input to the multiplier 31 to vary the loop gain of the horizontal oscillator 30, FIG. 7. Diode D1, capacitor C1, and resistor R12 form a peak detector with input from a potential divider, constituted by resistors R10 and R13 which are connected across the horizontal deflection yoke 10, FIG. 7. Thus when the amplitude of the yoke voltage falls, and hence the picture width is too small, the output of the operational amplifier 34 will increase, raising the loop gain of the horizontal oscillator 30, FIG. 7. Consequently the amplitude of oscillation will be stabilized.

When the amplitude of the horizontal scan is modulated as described above to correct for E-W pincushion, it may be desirable to select different sets of linearity corrections in store 23, FIG. 4, depending upon the vertical position. This is illustrated schematically by line 17', FIG. 4. This input can be generated by dividing the vertical axis of the screen into a number of zones using a digital counter, known per se and not shown in the drawings.

While the invention has been particularly shown and described with reference to preferred embodiments thereof, it will be understood by those skilled in the art that various changes in form and detail may be made therein without departing from the spirit and scope of the invention.

Having thus described my invention, what I claim as new, and desire to secure by Letters Patent is:

1. Cathode ray tube drive circuitry comprising in combination
    deflection generator means,
    means for tracing a raster on the screen including a deflection yoke which is arranged to cooperate with said deflection signal generator means so as to cause the electron beam repetitively to trace a line across the screen,
    and means for generating pel clock pulses each defining an internal during which the intensity of the electron beam is modulated in accordance with the required image,
    characterized in that said cathode ray tube drive circuitry comprises a variable frequency oscillator for producing said pel clock pulses, a digital store containing representations indicative of anticipated variations in scanning speed at certain points of the scanned line, and means for varying the frequency of the oscillator in accordance with the stored representations to thereby correct for anticipated speed variations in said scanning speed by slowing or speeding the oscillator.

2. Drive circuitry as claimed in claim 1 characterized in that said representations are stored in a digital store in the form of a read only store.

3. Drive circuitry as claimed in claim 1 characterized in that said oscillator is a voltage controlled oscillator connected to receive a signal indicative of the actual horizontal scanning speed of the electron spot.

4. Drive circuitry as claimed in claim 1 characterized in that said deflection signal generator means operates to generate a sinusoidal deflection waveform and includes a tuned circuit comprising said yoke, said pel clock being synchronized with said tuned circuit.

5. Drive circuitry as claimed in claim 4, wherein said deflection signal generator means operates to trace successive lines in opposite directions across the screen.

* * * * *